United States Patent
Greene, Jr. et al.

(10) Patent No.: US 6,377,925 B1
(45) Date of Patent: Apr. 23, 2002

(54) ELECTRONIC TRANSLATOR FOR ASSISTING COMMUNICATIONS

(75) Inventors: Morgan Greene, Jr.; Virginia Greene, both of Bradenton; Harry E. Newman, Ellenton; Mark J. Yuhas; Michael F. Dorety, both of Sarasota, all of FL (US)

(73) Assignee: Interactive Solutions, Inc., Sarasota, FL (US)

( * ) Notice: Subject to any disclaimer, the term of this patent is extended or adjusted under 35 U.S.C. 154(b) by 31 days.

(21) Appl. No.: 09/610,675

(22) Filed: Jul. 7, 2000

Related U.S. Application Data

(60) Provisional application No. 60/171,106, filed on Dec. 16, 1999.

(51) Int. Cl.[7] .......................... G09B 21/04; G10L 21/06; G10L 15/26; G10L 13/08

(52) U.S. Cl. ........................ 704/271; 704/235; 704/260; 379/52

(58) Field of Search ................................. 704/235, 260, 704/271; 379/52

(56) References Cited

U.S. PATENT DOCUMENTS

| | | |
|---|---|---|
| 4,215,240 A | 7/1980 | Ostrowski |
| 4,260,229 A | 4/1981 | Bloomstein |
| 4,307,266 A | 12/1981 | Messina |
| 4,365,315 A | 12/1982 | Jamnik |
| 4,520,501 A | 5/1985 | DuBrucq |
| 4,546,383 A | 10/1985 | Abramatic et al. |
| 4,631,748 A | 12/1986 | Breedlove et al. |
| 4,879,210 A | 11/1989 | Hamilton |
| 4,884,972 A | 12/1989 | Gasper |
| 4,984,177 A | 1/1991 | Rondel et al. |
| 5,157,759 A | 10/1992 | Bachenko |
| 5,302,132 A | 4/1994 | Corder |
| 5,475,798 A | 12/1995 | Handlos |
| 5,481,454 A | 1/1996 | Inoue et al. |
| 5,487,143 A * | 1/1996 | Southgate ................... 345/790 |
| 5,544,050 A | 8/1996 | Abe et al. |
| 5,588,839 A | 12/1996 | Shimoda |
| 5,659,764 A | 8/1997 | Sakiyama et al. |

(List continued on next page.)

Primary Examiner—Tālivaldis Ivars Šmits
(74) Attorney, Agent, or Firm—Jones, Tullar & Cooper, PC

(57) ABSTRACT

An electronic translator translates input speech into multiple streams of data that are simultaneously delivered to the user, such as a hearing impaired individual. Preferably, the data is delivered in audible, visual and text formats. These multiple data streams are delivered to the hearing-impaired individual in a synchronized fashion, thereby creating a cognitive response. Preferably, the system of the present invention converts the input speech to a text format, and then translates the text to any of three other forms, including sign language, animation and computer generated speech. The sign language and animation translations are preferably implemented by using the medium of digital movies in which videos of a person signing words, phrase and finger spelled words, and of animations corresponding to the words, are selectively accessed from databases and displayed. Additionally the received speech is converted to computer-generated speech for input to various hearing enhancement devices used by the deaf or hearing-impaired, such as cochlear implants and hearing aids, or other output devices such as speakers, etc. The data streams are synchronized utilizing a high-speed personal computer to facilitate sufficiently fast processing that the text, video signing and audible streams can be generated simultaneously in real time. Once synchronized the data streams are presented to the subject concurrently in a method that allows the process of mental comprehension to occur. The electronic translator can also be interfaced to other communications devices, such as telephones. Preferably, the hearing-impaired person is also able to use the system's keyboard or mouse to converse or respond.

68 Claims, 11 Drawing Sheets

U.S. PATENT DOCUMENTS

| | | |
|---|---|---|
| 5,679,001 A | 10/1997 | Russell et al. |
| 5,724,410 A | 3/1998 | Parvulescu et al. |
| 5,734,923 A | 3/1998 | Sagawa et al. |
| 5,741,136 A | 4/1998 | Kirksey et al. |
| 5,765,131 A | 6/1998 | Stentiford et al. |
| 5,774,857 A | 6/1998 | Newlin |
| 5,839,109 A | 11/1998 | Iwamida |
| 5,857,099 A | 1/1999 | Mitchell et al. |
| 5,887,069 A | 3/1999 | Sakou et al. |
| 5,890,120 A | 3/1999 | Haskell et al. |
| 5,938,447 A | 8/1999 | Kirksey |
| 5,953,692 A * | 9/1999 | Siegel .......................... 704/1 |
| 5,982,853 A | 11/1999 | Liebermann |

* cited by examiner

ELECTRONIC TRANSLATOR FOR ASSISTING COMMUNICATIONS

CROSS REFERENCE TO RELATED APPLICATIONS

This application claims the benefit under 35 USC 119(e) of U.S. Provisional Application No. 60/171,106, filed Dec. 16, 1999.

BACKGROUND OF THE INVENTION

1. Field of the Invention

The present invention relates in general to an electronic translator system and methods that are particularly suited for facilitating two-way conversations or communications between speaking and/or hearing disabled individuals, and a person capable of normal communications.

2. Description of the Prior Art

In the United States, more than 28 million people, or about 10 percent of the population, have hearing impairments. These individuals often go through life without the opportunity for education, employment or the ability to lead normal lives. In the past 25 years there have been very few technological advancements related to the improvement of education or the communication skills of the deaf, hearing-impaired, blind deaf or hearing mute. Although various types of hearing aids including Cochlear implants and external FM devices have brought some degree of relief to the more profound hearing-impaired, these devices suffer from a number of shortcomings that impede their ability to assist the hearing-impaired individual in improving their communication skills.

For example, cochlear implants are intended to act as artificial cochleae by simulating the sensory hairs that a deaf person is lacking. In response to sensed sound that may come from a person's voice, the cochlear implant generates electrical impulses that stimulate the hearing receptors in the deaf person's brain. However, the devices respond not only to a person's voice, but also to all types of ambient background noise, including other people's voices, for example. As a result, the cochlear implants generate signals from numerous aural sources that the hearing impaired individual cannot distinguish from each other. A typical outcome is that a hearing impaired individual with a cochlear implant will simply turn the device off since they cannot associate the inputs generated by the implants with words spoken by a person with whom they are trying to communicate.

Other electronic devices have been developed recently that are designed to assist hearing impaired individuals in learning sign language, for example. These types of devices typically receive as input, one or more phrase or words that are entered with a keyboard, for example, and generate animations of signing hand movements that are associated with the entered words and phrase. These types of devices are certainly useful learning tools for the hearing impaired individual, but are of little value for assisting real-time communications. To date, known real-time communication aids for the hearing impaired have been limited either to the aforementioned cochlear implants and other electronic hearing aids, and devices that can convert spoken words to printed text. Speech-to-text translators, while useful for communicating with a hearing impaired individual, cannot be used to teach the hearing impaired individual the sound of the translated words as the text is generated. Until now, a need has therefore remained for a communications and learning aid for hearing impaired and other individuals that does not suffer from the shortcomings of known devices.

SUMMARY OF THE INVENTION

The present invention addresses the shortcomings of known communication and learning assistance devices for hearing impaired individuals, or the like, through provision of an electronic translator system and methods that translate input speech and text into multiple streams of data that are simultaneously delivered to a user. Preferably, the data is delivered in audible, visual and, in the case of speech input, text formats. These multiple data streams are delivered to the hearing-impaired individual in a synchronized fashion, thereby creating a cognitive response. In this manner, the present invention allows a deaf or hearing-impaired person to comprehend spoken language, to achieve two-way communications without the requirement of a human translator, to learn natural speech, to learn sign language and to learn to read. The invention is also capable of interconnection with cochlear implants and hearing aids, and alleviates the data overload caused by multiple sounds with varying volume levels being introduced to the human brain simultaneously.

To achieve the foregoing functionality, the system of the present invention, in its most preferred form, is implemented using a personal computer and various conventional peripheral devices. These include, for example, a video display monitor, keyboard, mouse, one or more audio input devices, e.g., microphone, telephone transmitter, etc. and one or more audio output devices, e.g., audio speakers, telephone receiver and hearing enhancement devices used by the deaf or hearing-impaired, such as cochlear implants and hearing aids. The computer is loaded with a number of software programs or modules that perform various translations on received speech or text. In particular, speech received by the audio input device is preferably converted to text, sign language, computer-generated speech for input to the audio devices, and animation or still images that are associated with the words (e.g., an image of an object). The sign language translation is preferably implemented by using the medium of digital movie images in which videos of a person signing words, phrase and finger spelled words are selectively accessed from a database and displayed on the video display monitor. A database of animations and images is also provided, with each of the animations or images being associated with a word or phrase in the text stream. Other databases that are also preferably provided include a phonetic spelling database to enable the phonetic spelling of words to be displayed, and an audio sound database that contains brief audio segments of environmental sounds that are associated with the words or phrase in the text stream.

The computer is preferably selected to have a fast enough processor, e.g., 500 MHz or higher, that the text, signing, audio, animation and other streams can be generated virtually simultaneously in real time, and synchronized with one another. Once synchronized, the data streams are presented to the user concurrently in a method that allows the process of mental comprehension to occur. More particularly, as the spoken words are translated into text, or the words are initially entered as text, they are simultaneously displayed on the video display monitor along with the corresponding signing videos and animation or images, and are supplied to the audio output devices. Preferably, the text words are highlighted on the screen as they are signed and spoken through the audio devices. In this manner, the user of the translator can readily associate sounds generated by a cochlear implant or a hearing aid with the signed and printed words, thus greatly improving the learning and comprehension process. In addition, the problem associated with background noise interference with the cochlear implant or hearing aid is eliminated since the generated sounds correspond only to the words of text.

Preferably, the hearing-impaired person is also able to use the system's keyboard or mouse to freely converse or respond. Words and phrases typed into the system are converted to computer-generated voice and delivered to the intended audience by the audio speakers or other means, such as the standard or cellular telephone. At this point the system has facilitated two-way conversation between a person capable of normal communications and a hearing-impaired, deaf or mute individual without the requirement of a human translator.

In addition to facilitating two-way conversation, the present invention also enables the deaf and mute to learn to speak. If an individual is physically capable of vocalizing, the invention can be used as a tool to teach linguistics. The user can utilize the computer's keyboard or mouse to generate words or phrases. The user can then practice repetition of those words or phrases while at the same time hearing a computer generated simulation of their own voice, thereby allowing them the ability to practice and improve speech. Once the user becomes proficient at basic speech, they can use the system's microphone capability in place of the keyboard or mouse. When the system recognizes the user's speech patterns it will present them in a synchronized fashion in text, sign language and by computer-generated voice. The generation of these three data streams will support the user's comprehension of the clarity in which he is speaking thereby affording the opportunity for improvement.

The present invention can also be employed to teach the deaf hearing-impaired, and even individuals with normal hearing and speech skills, to comprehend, communicate and translate multiple variations of sign language. For example, these include but are not limited to American Sign Language, Signed Exact English (SEE), pidgin and various forms of international sign language. As is well known, sign language is a system whereby the hands and arms are used to motion or gesture a communication. For many of the deaf and hearing-impaired, it is the first language learned and crucial to their ability to communicate and achieve an education. The present invention allows sign language to be taught in conjunction with human intervention as in the traditional teacher student scenario, or in a self teach mode whereby the subject can either speak or use the system's keyboard or mouse to achieve repetitious comprehension of motions and gestures required to create a word or sentence.

Yet another preferred feature of the invention is enabling the deaf hearing impaired or hearing mute, to make and receive standard or cellular telephone calls. To accomplish this task, the system functions as previously described, but allows the option of dialing telephone numbers from the keyboard or with use of the mouse. Once the computer has dialed the number, a digital signal is transmitted through the system that announces the fact that the call is being generated by a hearing or speech impaired individual. The called party will respond either by voice or telephone keypad to acknowledge receipt of the call. The system then converts the voice or digital response to computer generated voice, text and sign language. In this way the deaf hearing impaired or hearing mute individual is able to freely converse by use of the system and its keyboard or mouse. This feature is critical in that it allows the impaired individual to communicate with emergency 911 services. The optional use of a standard telephone coupling device is also provided.

BRIEF DESCRIPTION OF THE DRAWINGS

The foregoing and other features and advantages of the present invention will become apparent from the following detailed consideration of a preferred embodiment thereof taken in conjunction with the accompanying drawings, in which.

DETAILED DESCRIPTION OF A PREFERRED EMBODIMENT

Figure 1:
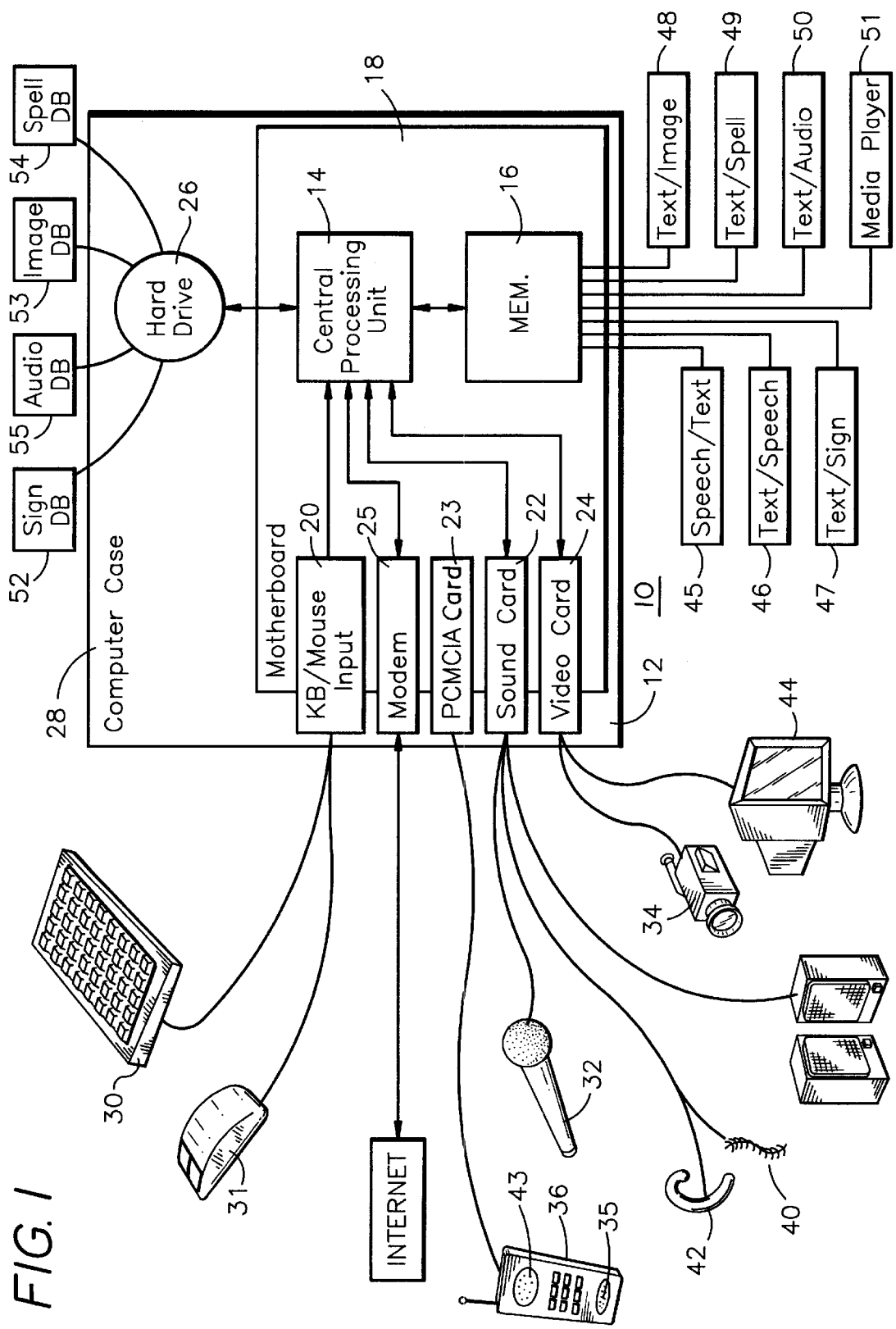
FIG. 1 is a schematic block diagram of an electronic translator that is constructed in accordance with a preferred embodiment of the present invention, and show the translator's hardware elements.

FIG. 1 illustrates the hardware of an electronic translator 10 that is constructed in accordance with a preferred embodiment of the present invention. The hardware includes a personal computer 12 comprised of a central processing unit (CPU) 14 and one or more memory chips 16 mounted on a motherboard 18. Preferably, the CPU has a clock speed of 500 MHz or greater to insure that multiple translations of speech or text data can be made simultaneously in real time, although a processor having a somewhat slower clock speed could also be used. Also mounted on the motherboard 18 are a keyboard/mouse input circuit 20, a sound card 22, a PCMCIA card 23, a video card 24 and a modem 25 or other communications interface for connecting the translator 10 to the Internet, for example. The CPU 14 is also interfaced to a hard drive 26. As is also conventional all of the foregoing elements are preferably housed in a housing 28, such as a conventional PC desktop or tower housing, or a laptop housing.

The PC 12 receives multiple inputs from a number of peripheral devices, including a keyboard 30 and a mouse 31 via the keyboard/mouse input circuit 20, a microphone 32 via the sound card 22, a video camera 34 via the video card 24 and a transmitter 35 in a standard or cellular telephone 36 via the PCMCIA card 23, although the sound card 22 could also be used for this purpose. The sound card 22 also supplies output signals to a number of audio devices, including one or more speakers 38, one or more assisted learning devices including a cochlear implant 40 and a hearing aid 42, while the PCMCIA card 23 supplies audio signals to a receiver 43 in the telephone 36 (again, the sound card 22 could also be used for this purpose). A left channel in the sound card 22 is employed for sending output signals to the telephone 36, cochlear implant 40 and hearing aid 42, while a right channel, that can be selectively turned on or off, is employed for sending output signals to the speakers 38. The video card 24 supplies output video signals to a display device, such as a video display monitor 44.

As will be discussed in greater detail in conjunction with the flowcharts of FIGS. 6A–6H, the electronic translator 10 receives speech inputs from an individual through the microphone 32, and converts these speech inputs into multiple forms. These include text, signing and other images that are displayed on the monitor 44, and audio signals that are supplied to one of the audio output devices, including the speakers 38, cochlear implant 40, hearing aid 42 and/or telephone 36. In addition, an individual using the translator 10 can input text via the keyboard 30, or access text from the Internet via the modem 25, for display on the video display 44, or translation into synthesized speech that is played on the speakers 38 or transmitted through the telephone 36.

To provide the various translation functions, the PC 12 is preferably programmed with a number of software programs or modules, including a speech-to-text translator 45, a text-to-speech translator 46, a text-to-sign language translator 47, a text-to-animation or image translator 48, a text-to-phonetic spelling translator 49, a text-to-audio sound translator 50 and a media player 51 for playing signing videos and audio sounds. Preferably, a number of these programs are commercially available off-the-shelf products. For example, the speech-to-text translator 45 can be Dragon System's NATURALLY SPEAKING or IBM's VIA VOICE, while the text-to-speech translator 46 can be MICROSOFT's text-to-speech engine, and the media player 51 is preferably WINDOWS MEDIA PLAYER.

Figure 3A:
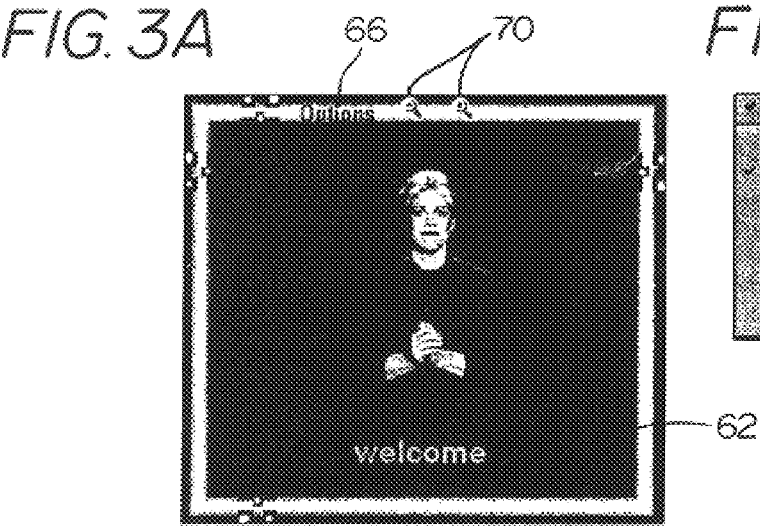
FIG. 3A is an illustration of a signing window that forms part of the display screen.

A number of databases are stored in the hard drive 26 that are employed by the various translators. The text-to-sign language translator 47 works in a unique manner by accessing video movies of signed words and letters that are stored in a signing database 52. The database 52 contains thousands of short (e.g., 2 seconds) video clips, each of which shows a person signing a particular word. The clips are specially produced so that many of them can be displayed seamlessly in sequence as translated sentences are signed. This is accomplished by insuring that the person signing the words begins and ends each video clip with their hands in the same folded position as illustrated in FIG. 3A, for example. The text-to-sign language translator 47 functions by comparing each word of text to those stored in the database 52, accessing the video movie clip for the word, and causing the media player 51 to play the clip. If a word is not found in the database 52, the text-to-sign language translator 47 breaks the word down into individual letters and plays video clips in the database 52 that show a person finger spelling each letter in the word.

The text-to-animation or image translator 48 operates in a similar manner by using each word of text, or groups of words in the text to access an animation/image database 53 that contains animations, cartoons, etc., and/or images that are in some way related to each word or phrase, e.g., pictures of items, etc. For example, the word "cow" can be associated to an image of a cow, while the phrase "the cow jumped over the moon" can be associated with an animation of a cow jumping over the moon.

The text-to-phonetic spelling translator 49 accesses a phonetic spelling database 54 that contains text of the phonetic spelling of thousands of different words that can be displayed on the video monitor 44 along with the translated text, animation, still images and signing videos. Finally, the text-to-audio sound translator 50 accesses an audio sound database 55 that contains brief audio clips of environmental and other sounds that are associated with selected words or phrase in the text stream. For example, the phrase "fire truck" can be associated with the sound of a siren that may be played through the speakers 38, cochlear implant 40 and/or hearing aid 42 simultaneously as the phrase is highlighted on the video display 44. It should be noted in this regard, that the playing of the associated sound will not occur if the text-to-speech translator 46 is enabled.

In the preferred embodiment, detected speech is always translated first to text by the speech-to-text translator 45 before it is translated further by any of the remaining translators 46–50. It should be understood, however, that software could also be employed that would receive speech as an input, and generate the signing videos, animation, images, and/or sounds as output, although some type of word identification procedure would still obviously have to be employed by any such program. Further, as will be discussed in greater detail later, a user of the electronic translator 10 has the option to enable or disable any of the translation functions.

Figure 2:
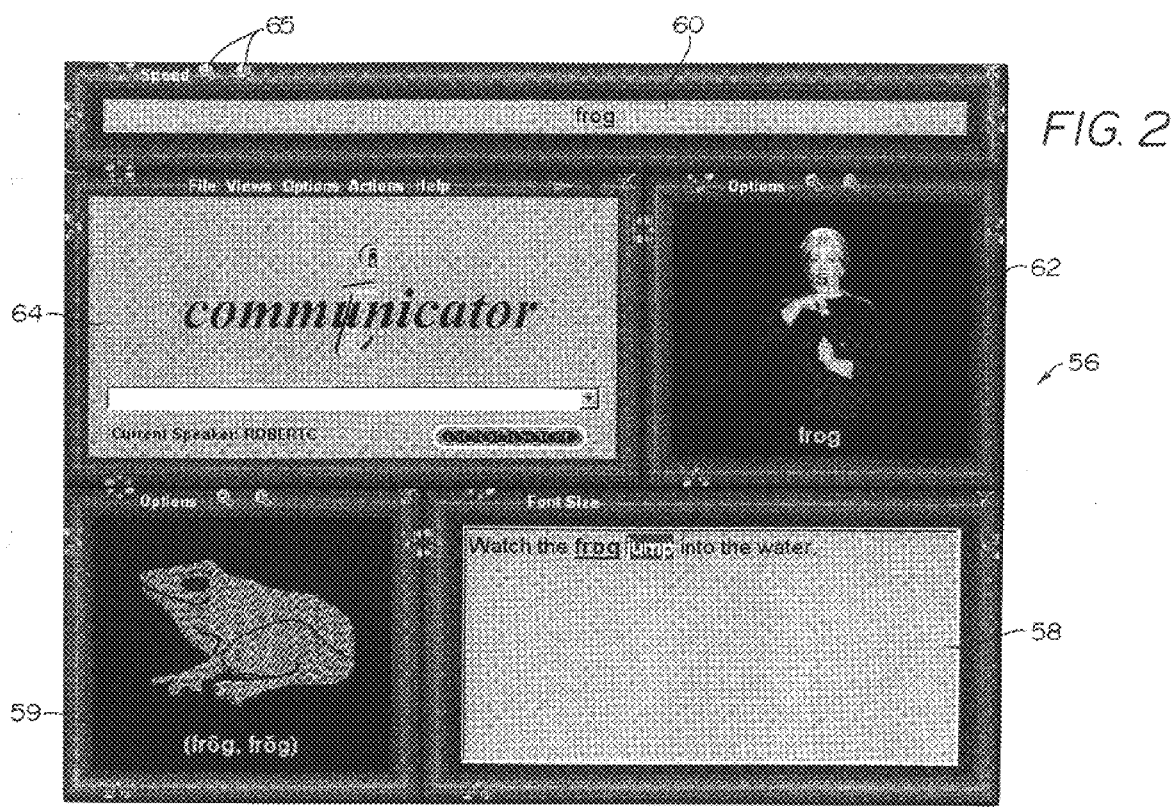
FIG. 2 is an illustration of a sample display screen showing the various windows that can be simultaneously displayed on a video display device in the preferred embodiment.

FIG. 2 shows a sample display screen 56 for the translator 10, and illustrates a number of windows that are preferably provided. More particularly, the display screen 56 includes a text window 58, an animation/image/phonetic spelling display window 59, a marquee window 60, a signing window 62 and a control window 64. The text window 58 is employed to display text that has been converted by the speech-to-text translator 45. In addition, the displayed text can be edited and supplemented through use of the keyboard 30. The animation/image/phonetic spelling display window 59 is employed to display images or animations that are associated with highlighted words or phrases in the text window 58, and also to display the phonetic spelling of the words. The marquee window 60 is employed to display a scrolling version (from right to left) of one line of the text as it is generated by the speech-to-text translator 45, and includes a pair of buttons 65 to increase or decrease the scrolling speed.

Figure 3B:
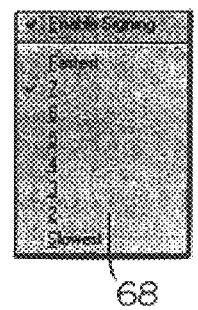
FIG. 3B is an illustration of a drop down menu that is employed for selecting signing display options.

The signing window 62 displays the sign language and finger spelling videos, as is shown in greater detail in FIG. 3A. An options menu icon 66 is disposed at the top of the signing window 62. When selected, as illustrated in FIG. 3B, a drop down menu 68 is generated that allows the signing option to be enabled or disabled. In addition, the play speed of the videos can be adjusted to any one of 8 speeds so that the speed can be synchronized with the text generation speed. It should be noted in this regard that the higher speeds play the signing at speeds that are notably faster than a human can physically sign. As a result, this feature of the invention is particularly useful in that it enables "speed signing" for individuals that are particularly adept at reading sign language. A pair of buttons 70 is also provided at the top of the signing window 62 that are used to enlarge or reduce the window's size.

Figure 4:
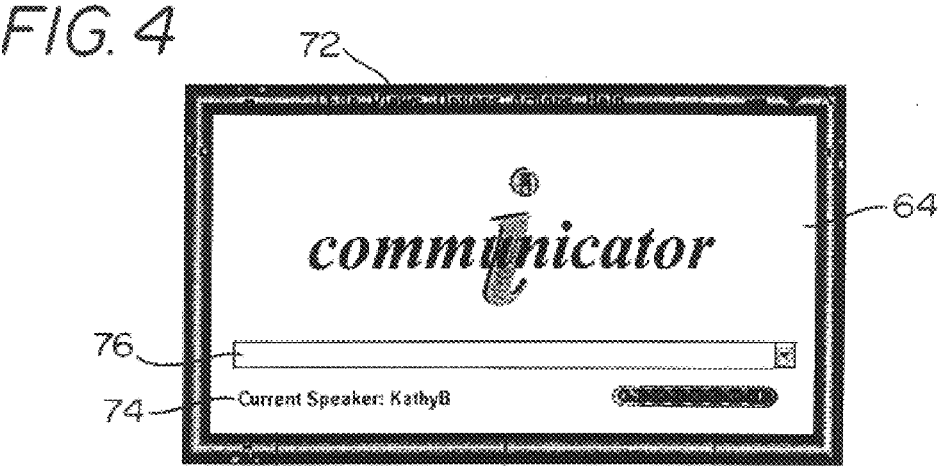
FIG. 4 is an illustration of a control window that forms part of the display screen.

The control window 64 facilitates management and organization of the windows, and the way that they function, and is illustrated in more detail in FIG. 4. A menu bar 72 is provided along the top of the control window 64 for this purpose. As is conventional, the speech-to-text translator 45 can be trained to recognize different voices, and the menu bar 72 can be used to select the identity of the speaker that the speech-to-text translator 45 is to recognize. The identity of the selected speaker is displayed near the bottom of the control window 64 as illustrated at 74. A text entry box 76 is also disposed in the control window 64 that permits entry, through the keyboard 30, of text or messages for storage or conversion to speech. Through the menu bar 72, other system functions can also be implemented including management of text files, setting of speaking and signing options, and obtaining system help.

Figure 5:
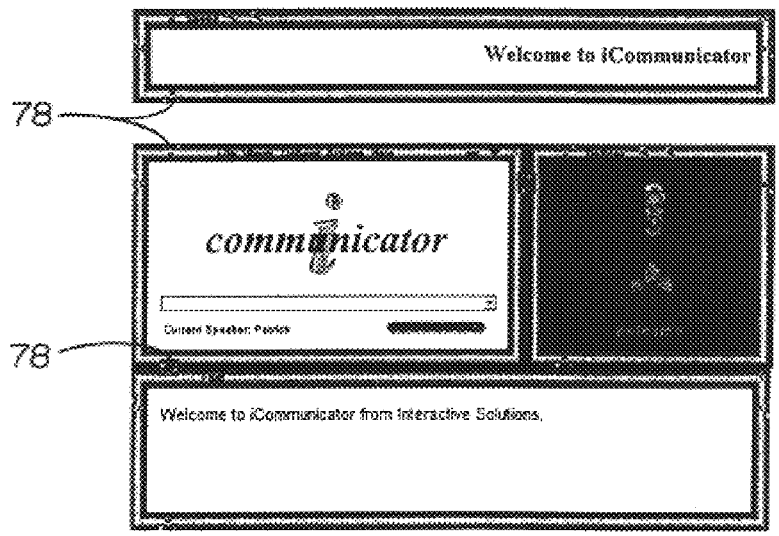
FIG. 5 is an illustration of a the various windows of the display screen showing how the windows can be selectively docked to one another or unlocked from each other.

Preferably, the windows 58–64 can be selectively docked or unlocked as illustrated in FIG. 5, and can be selectively enabled or disabled (the animation/image/phonetic spelling display window 59 is disabled in FIG. 5). Docking allows a user to arrange the four windows in any way that the user prefers. To facilitate this function, a plurality of latch icons 78 are employed to indicate whether the windows are locked to one another, and can be "clicked on" with the mouse 31 to be latched or unlatched. When the windows are unlatched, they can be freely moved relative to one another.

Figure 6A:
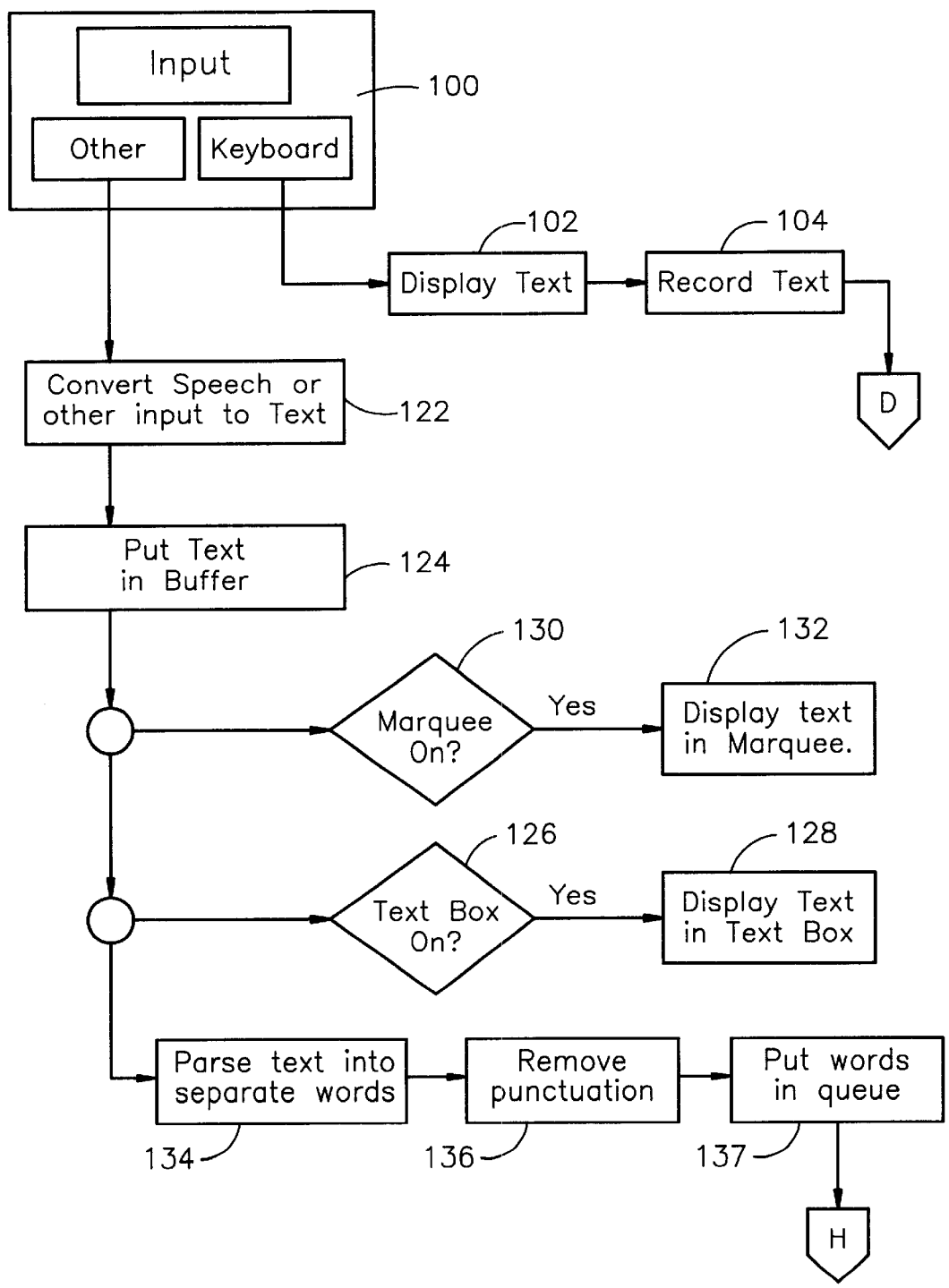
FIGS. 6A–6H are flowcharts illustrating the software flow of the preferred embodiment of the present invention.

FIGS. 6A–6H are flowcharts that illustrate the preferred method of operation of the electronic translator 10. With reference first to FIG. 6A, there are two distinct flow streams to the method, one for input of text from the keyboard 30, and a second for input from other of the peripheral devices, such as from the microphone 32. First, if input is determined at step 100 to be received from the keyboard 30, the entered text is displayed on the video display 44 at step 102, and is recorded or stored at step 104. Next, referencing FIG. 6F, if the telephone 36 is attached and activated at step 106, then the text is converted to speech at step 108, and sent to the cell phone 36 at step 110 via the PCMCIA card 23 or the sound card 22. If the cell phone 36 is not attached or not activated and the keyboard input is to be spoken at step 112, then the right channel of the sound output is turned on at step 114. Next, the text is spoken at step 116 and played through the speakers 38, then the right channel of the sound output is turned off at step 118. It should be noted in this regard that the right channel of the sound card 22 is activated only when keyboard entered text is to be translated and spoken to avoid having the speakers 38 play speech that has just been spoken into the microphone 32. If the keyboard input is not to be spoken at step 112, then the software goes into a wait state at step 120 to wait for the next data input.

Returning to FIG. 6A, if the input from the data input means was determined at step 100 not to be a keyboard input, then the input is assumed to be speech from one of the audio input devices. The speech input is converted to text at step 122, put into a buffer at step 124, and applied to multiple branches of the method flow at this point. If it is determined at step 126 that the text display box is enabled, then the text is displayed via the video display 44 at step 128. Also, if the marquee option is enabled at step 130, then the text is displayed marquee style in the marquee window 60 on the video display 44 at step 132.

Figure 6B:
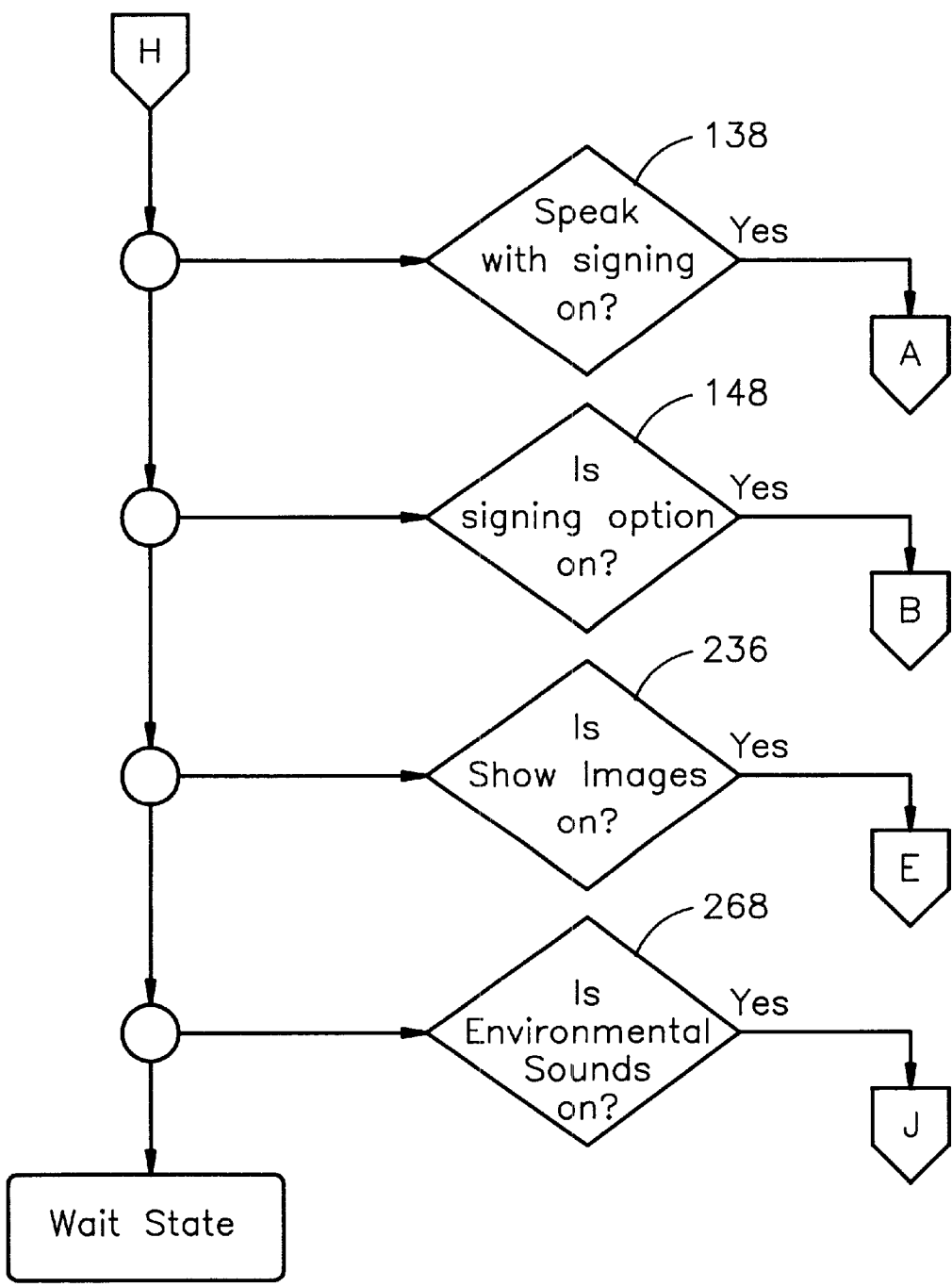
Figure 6C:
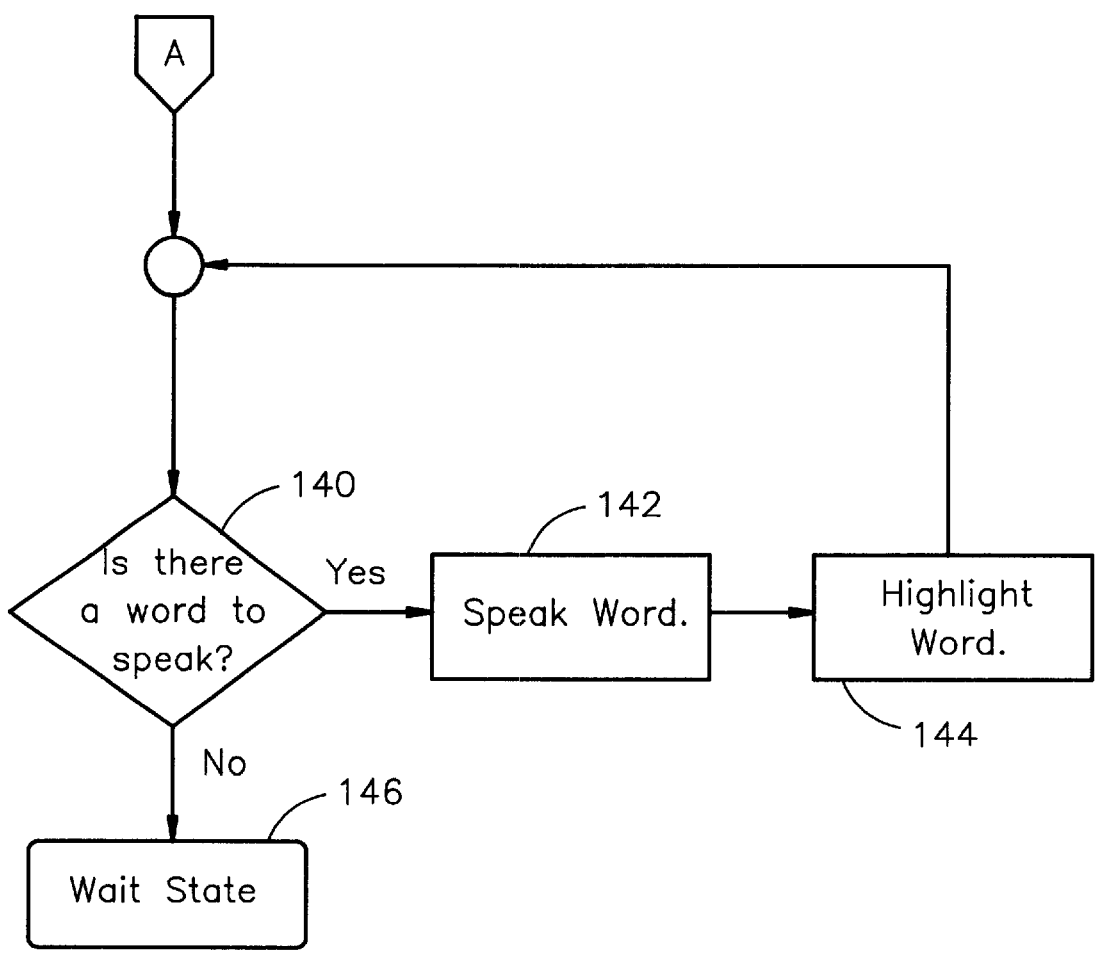

The third branch of the method flow is employed for the conversion of the text into sign language, animation or images and environmental sounds. To perform these translations, the phrases of text in the text buffer must first be parsed into separate words at step 134, the punctuation is removed at step 136, and the words are put into a queue at step 137. With reference to FIG. 6B, multiple queries are then performed to determine which translation options are enabled, and then carry out the appropriate steps for each. If the "speak with signing" option is determined to be on at step 138, then the process continues as illustrated in FIG. 6C. At step 140, it is determined whether there is a word to speak. If so, the word is spoken at step 142 through use of the text-to-speech translator 46 and one or more of the audio devices. In addition, the word is highlighted on the video display 44 at step 144 as it is spoken. Once it is determined that there are no more words left to be spoken, the process goes into a wait state at step 146.

Figure 6D:
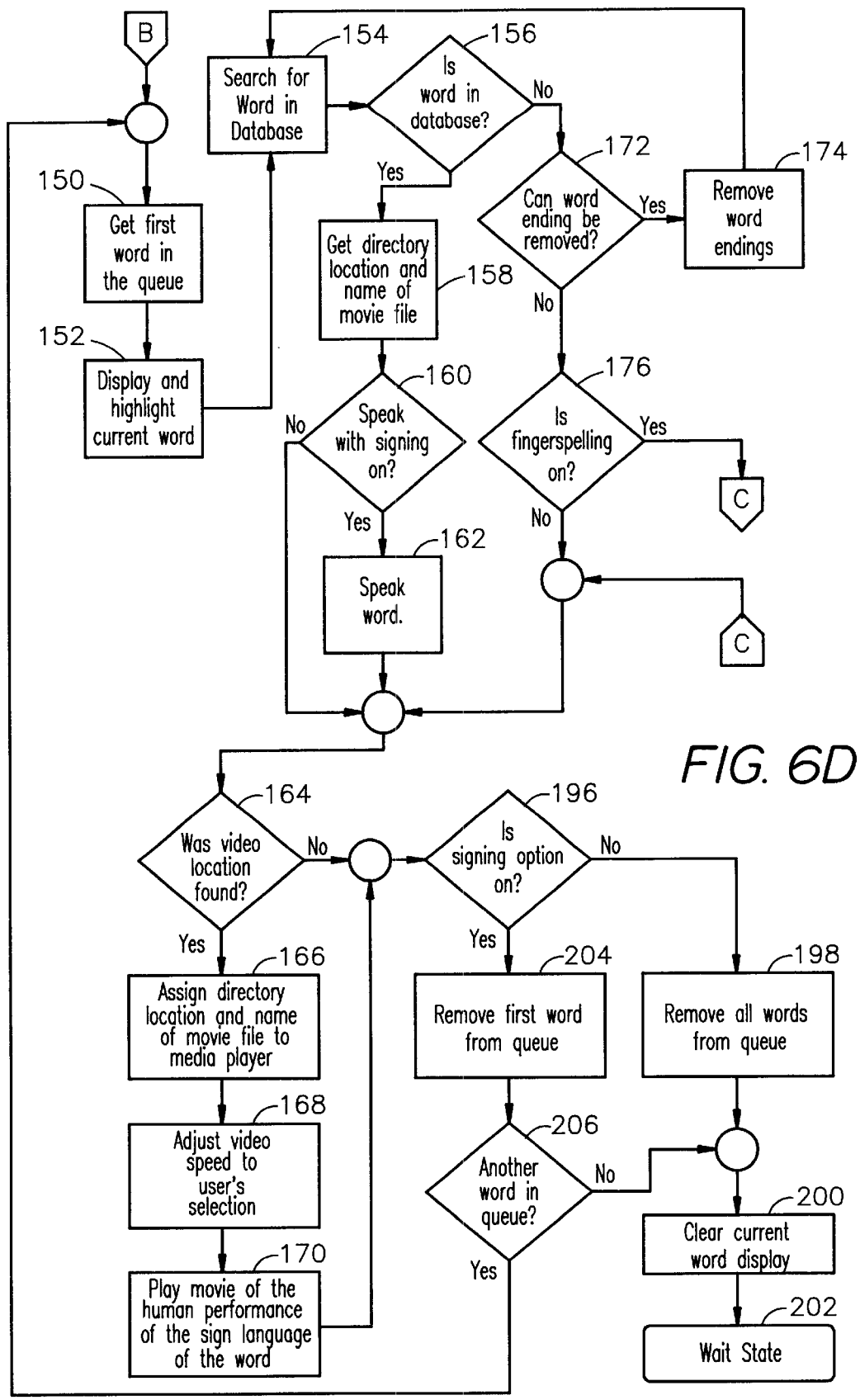

Referencing again FIG. 6B and also referencing FIG. 6D, if the signing option is determined to be on at step 148, the first word in the queue is retrieved at step 150, and the word is displayed and highlighted at step 152. A search is performed against the signing database 52 for that word at step 154. If it is determined at step 156 that the word is in the signing database 52, then the directory location and filename for the video for that particular word is retrieved at step 158. If it is determined at step 160 that "speak with signing" is turned on, then the word is spoken at step 162 via the sound card 22 to the appropriate ones of the audio devices. If a video was found at step 164, then the retrieved directory location and filename path is assigned to the media-player 51 at step 166. The playback speed of the video is adjusted according to the user's selection at step 168, and the media-player 51 is given the command to play the movie of the human performance of the sign language of the word at step 170.

Figure 6E:
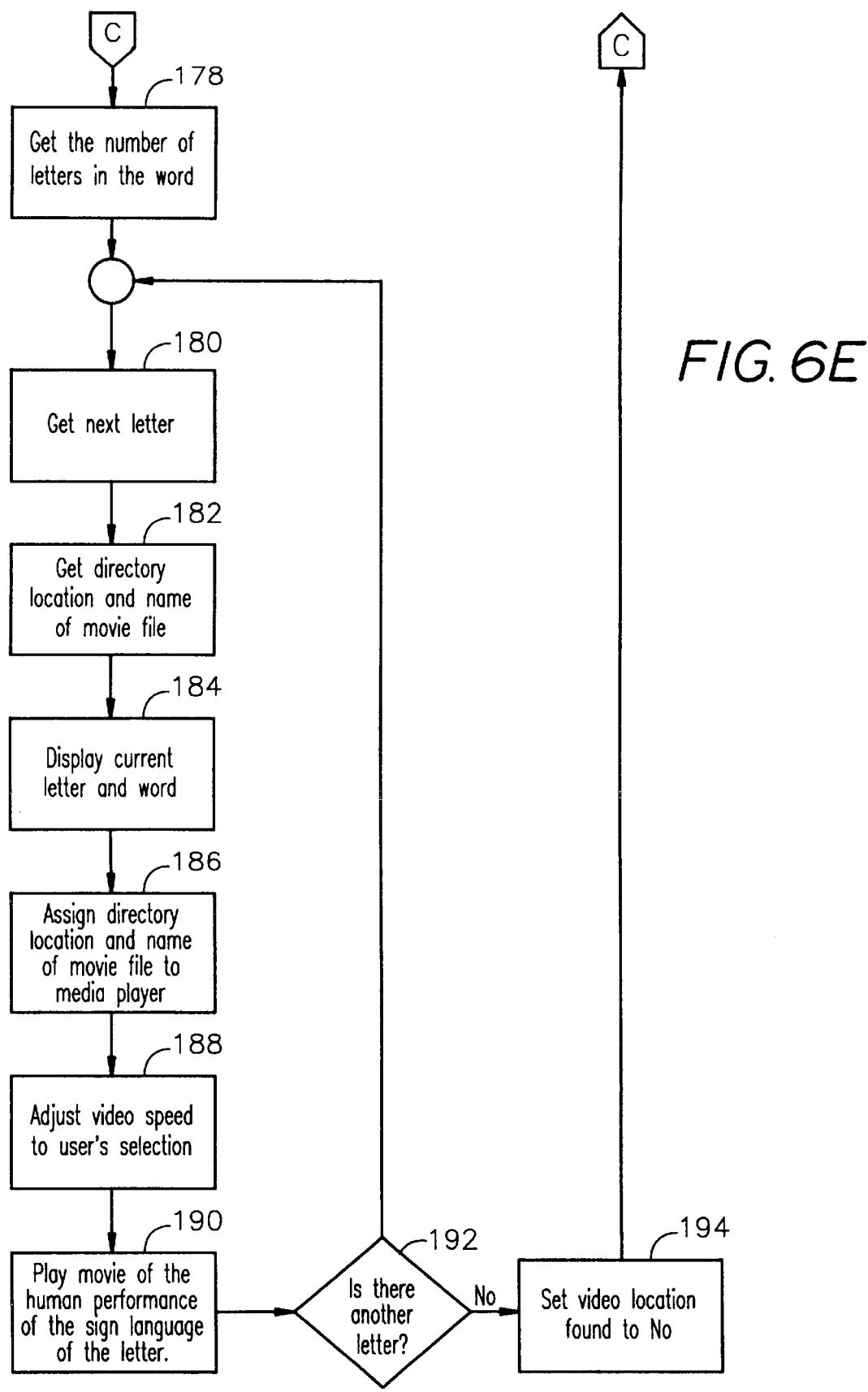
Figure 6F:
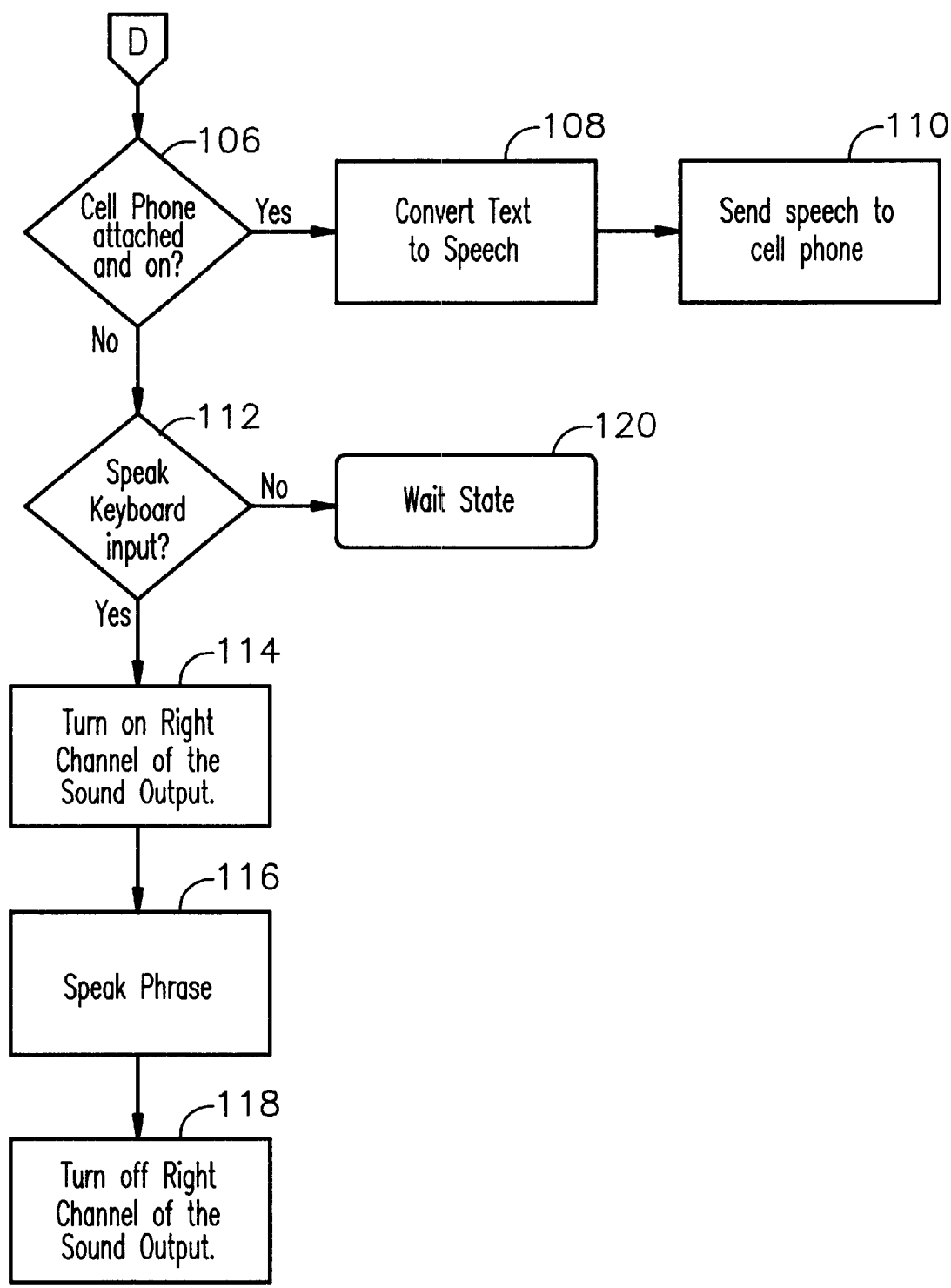

If the word is not found in the signing database 52 at step 156, and it is determined at step 172 that the word has an ending that can be removed, then the ending is stripped off at step 174 and the database is searched again. If the word does not have an ending that can be removed at step 172 and the finger spelling option is turned on at step 176, the process continues as illustrated in FIG. 6E. The number of letters in the word is counted at step 178 and the next letter is retrieved at step 180. The directory location and filename for the video for that particular letter is retrieved at step 182. The current letter and word is then displayed at step 184. Next, the retrieved directory location and filename path is assigned to the media player 51 at step 186, and the playback speed is optionally adjusted at step 188. The media player 51 is given the command to play the movie of the human performance of the finger spelled letter at step 190. If it is determined at step 192 that there is another letter in the word, then the process returns to step 180, and the next letter is retrieved. Otherwise, the "set video location found" switch is set to "No" at step 194 so that the "was video found" indicator returns "No" and the process returns to the "was video location found" step 164 in FIG. 6D.

Once the video movies of the word signing or finger spelling of the letters have been played, the process continues at step 196 where it checks to see if the signing option is on. If the signing option is off, then all the words are removed from the queue at step 198, the current word display is cleared at step 200, and the software goes into a wait state at step 202. If the signing option is on, then the first word is removed from the queue at step 204 and the queue is checked for another word at step 206. If there is another word in the queue, then the program returns to step 150 and the first word in the queue is retrieved as discussed previously. If there is not another word in the queue, then the current word is cleared from the display at step 200 and the software goes into the wait state at step 202.

Figure 6G:
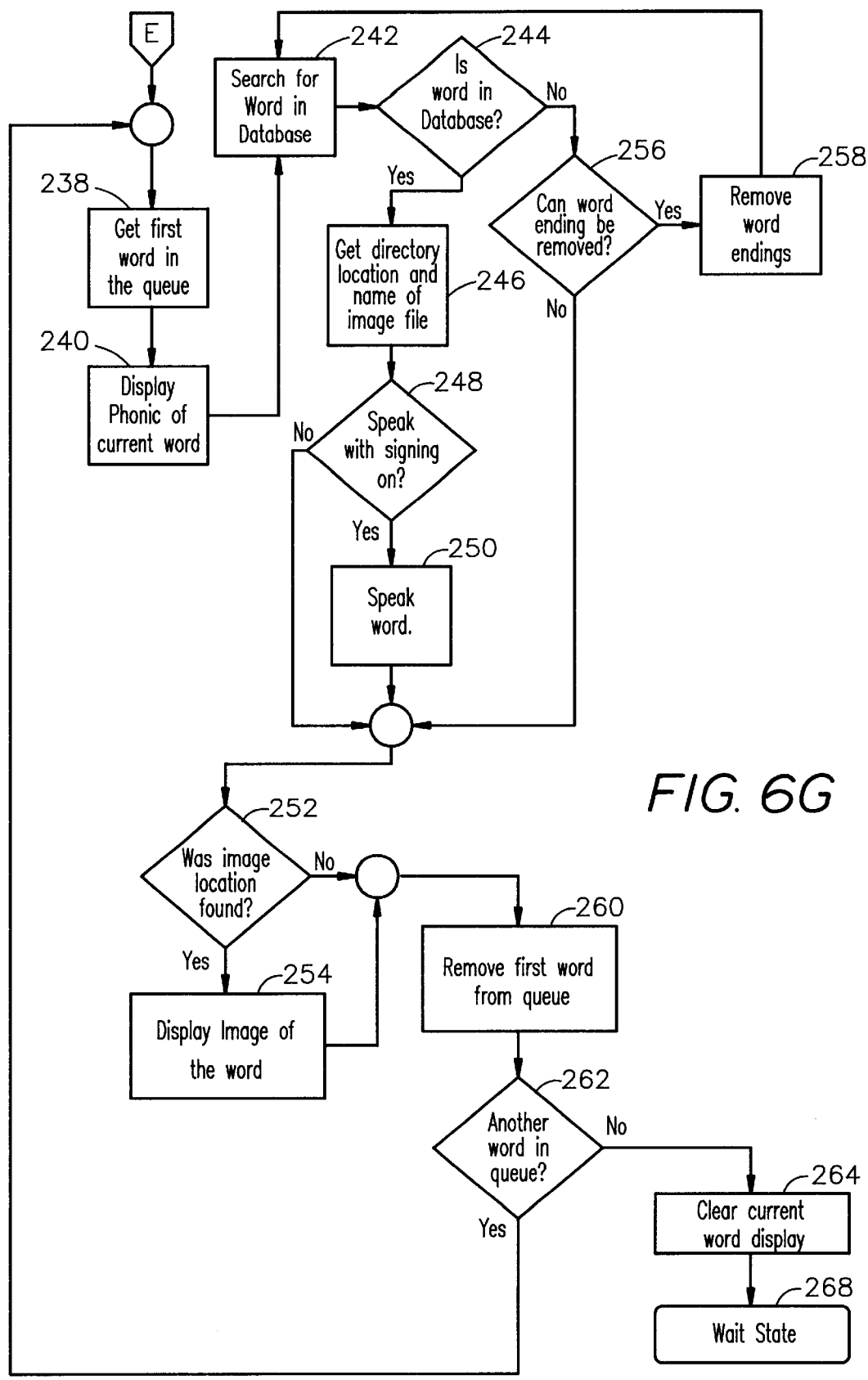

Returning once again to FIG. 6B, and also referencing FIG. 6G, if the "show images" option is determined to be on at step 236, then the first word in the queue is retrieved at step 238, and the phonetic spelling of the word is displayed at step 240. A search is performed against the animation/image database 53 for that word (or phrase) at step 242. If it is determined at step 244 that the word or phrase is in the database 53, then the directory location and filename for the image or animation for that particular word or phrase is retrieved at step 246. If it is determined at step 248 that "speak with signing" is turned on, then the word is spoken at step 250 via the sound card 22 to the appropriate ones of the audio devices. If it is determined at step 252 that an image location was found, then the image is displayed at step 254.

If the word is not found in the image database 53 at step 244, and it is determined at step 256 that the word has an ending that can be removed, then the ending is stripped off at step 258 and the database is searched again. Once the image display process is finished, the first word in the queue is removed at step 260, and a query is made at step 262 whether there is another word in the queue. If so, the process returns to step 238 for processing of the next word. If not, the current word is cleared from the display at step 264, and the process goes into the wait state at step 266.

Figure 6H:
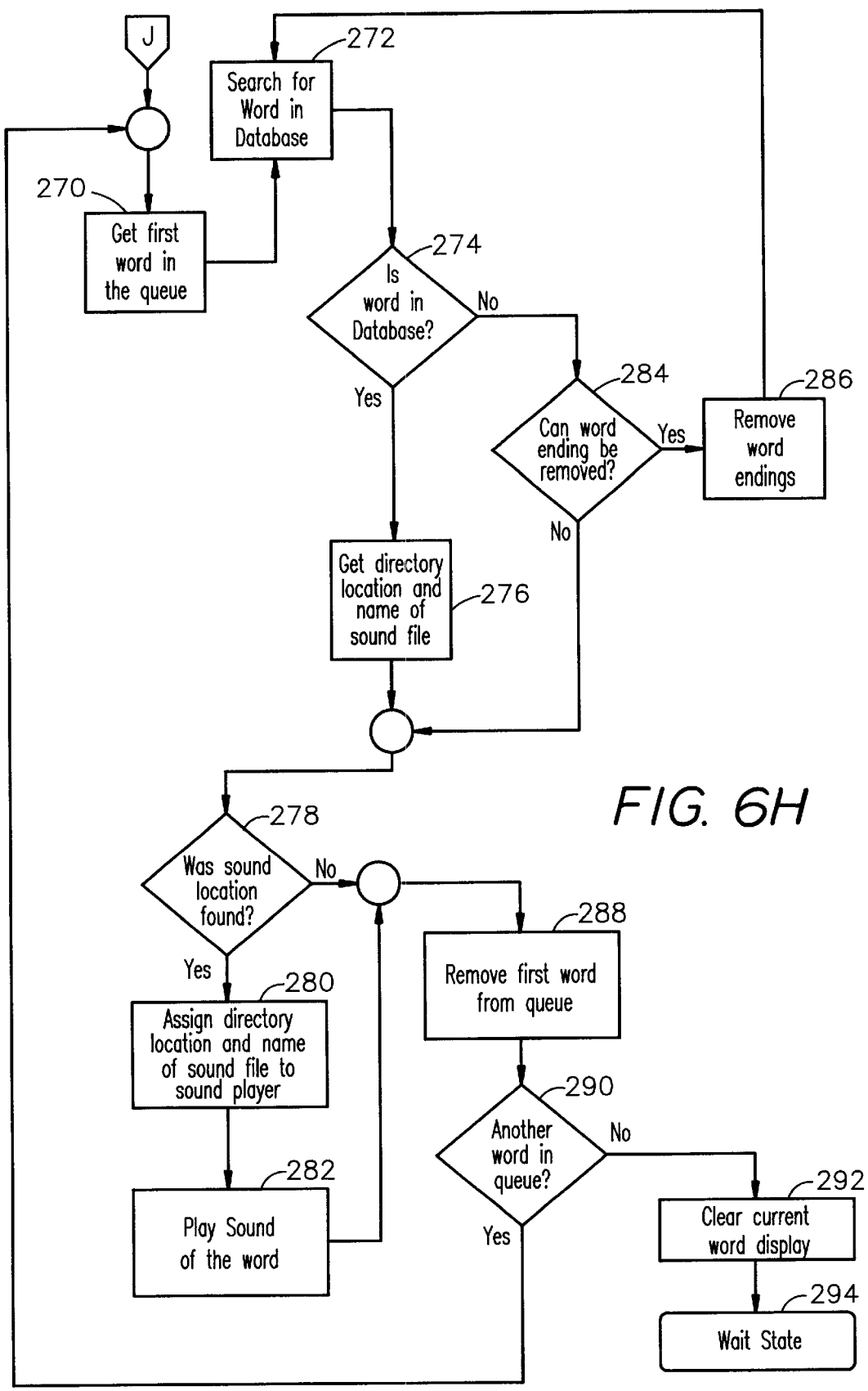

The last translation function that can be optionally employed with the electronic translator 10 is the conversion of words or phrases to related environmental sounds by the text-to-audio sound translator 50. If this option is determined to be enabled at step 268 as illustrated in FIG. 6B, the process continues as illustrated in FIG. 6H. At step 270, the first word in the queue is retrieved, and a search is performed against the audio sounds database 55 for that word at step 272. If it is determined at step 274 that the word is in the database 55, then the directory location and filename for the sound file for that particular word is retrieved at step 276. If it is determined at step 278 that the sound file location was found, then the directory location and name of the sound file are assigned to the media player 51 at step 280, and the sound associated with the word is played at step 282.

If the word is not found in the audio sounds database 55 at step 274, and it is determined at step 284 that the word has an ending that can be removed, then the ending is stripped off at step 286 and the database 55 is searched again. Once the search and sound play process is finished, the first word in the queue is removed at step 288, and a query is made at step 290 whether there is another word in the queue. If so, the process returns to step 268 for processing of the next word. If not, the current word is cleared from the display at step 292, and the process goes into the wait state at step 294.

In conclusion, the present invention represents a tremendous step forward in the field of communication and learning assistance for hearing impaired individuals. The generation of simultaneous multiple data streams in different formats and in real time provides a powerful learning and communications tool that heretofore has not been available. It should be noted that while the invention is particularly suited for use with hearing impaired individuals, the invention is also applicable to the blind deaf the hearing mute and those individuals defined as less than average learners suffering from a variety of physical, mental or emotional disabilities. The invention is also applicable to individuals with no related disabilities who nevertheless have an interest in learning sign language or improving reading skills.

Although the invention has been disclosed in terms of a preferred embodiment and variations thereon, it will be understood that numerous additional modifications and variations could be made thereto without departing from the scope of the invention as defined in the following claims.

What is claimed is:

1. An electronic translator for translating a text data stream into one or more forms in real time comprising:

a database containing a plurality of video clips of an actual person signing words, each of said video clips showing the signing of at least one word, said database also including a plurality of finger spelling video clips of an actual person signing individual letters of the alphabet;

a processor, said processor including a text-to-sign language translator for converting said text data stream into a video stream of an actual person using sign language to sign words in said data stream, said text-to-sign language translator including programming responsive to said text data stream for detecting words therein, sequentially retrieving video clips in said database showing signing of said words, and displaying said video clips sequentially on said video display, said text-to-sign language translator further including programming for determining whether a word in said text data stream does not have a corresponding signing video clip in said database, and if this is the case, accessing said finger spelling video clips to display sign language finger spelling of said word; and a video display interfaced to said processor for selectively displaying said video stream and text corresponding to said text data stream.

2. The electronic translator of claim 1, wherein said processor further includes a text-to-speech translator for converting said text data stream into a speech signal, and said translator further comprises an audio output device for receiving said speech signal, and generating speech sounds in response thereto.

3. The electronic translator of claim 2, wherein said audio output device comprises a cochlear implant, hearing aid or other hearing enhancement device whereby, a hearing impaired person can identify speech sounds generated by said cochlear implant, hearing aid or other hearing enhancement device as corresponding to words that are signed in said video stream.

4. The electronic translator of claim 1, wherein said text-to-sign language translator includes a speed control for adjusting a play speed of said video clips to enable synchronization of said video clips with said text data stream as they are simultaneously displayed on said video display.

5. The electronic translator of claim 1, wherein each of said video clips begin and end with a person in a selected position to facilitate seamless sequencing of said clips in said video stream.

6. The electronic translator of claim 1, further comprising a text-to-image translator in said processor for translating said text into one or more images that are associated with words in said text data stream, and displaying said images simultaneously with said words on said video display; and, an image database interfaced to said processor containing said images.

7. The electronic translator of claim 1, wherein said processor further includes programming for simultaneously displaying text corresponding to said text data stream on said display in a first, scrolling marquee format and in a second, static format.

8. The electronic translator of claim 1, wherein said processor further includes programming for displaying a plurality of information windows on said video display, including at least a first window for displaying said video stream and a second window for simultaneously displaying text corresponding to said text data stream.

9. The electronic translator of claim 8, wherein said processor further includes programming for selectively latching and unlatching said windows to and from one another to facilitate arrangement of said windows on said display either as a group, or individually.

10. The electronic translator of claim 1, further comprising a text-to-phonetic spelling translator in said processor for translating words in said text data stream into text of phonetic spelling of said words, and displaying said phonetic spelling text on said video display, and a phonetic spelling database interfaced to said processor containing said phonetic spelling text.

11. The electronic translator of claim 1, further comprising a text-to-audio sound translator in said processor for translating words in said text data stream into environmental sounds that are related to said words, and playing said audio sounds on an audio output device, and an audio sound database interfaced to said processor containing said environmental sounds.

12. The electronic translator of claim 1, further comprising an audio receiver for generating a speech signal in response to a person speaking, and a speech-to-text translator for converting said input speech signal into said text data stream.

13. The electronic translator of claim 12, further comprising a text-to-speech translator in said processor for translating said text data stream back into a second speech signal, and at least one audio output device interfaced to said processor for receiving said second speech signal and generating a speech sound simultaneously with the display of said video stream on said video display.

14. The electronic translator of claim 13, wherein said processor further includes programming for displaying text corresponding to said text data stream simultaneously with the generation of said speech sound and display of said video stream on said video display.

15. The electronic translator of claim 14, wherein said processor further includes programming for highlighting words in said text being displayed on said video display as said highlighted words are being signed by said text-to-sign language translator, and generated by said audio output device.

16. The electronic translator of claim 15, wherein said audio output device comprises a cochlear implant, hearing aid or other hearing enhancement device whereby, a hearing impaired person can identify speech sounds generated by said cochlear implant, hearing aid or other hearing enhancement device as corresponding to words that are signed in said video stream and highlighted in said text on said video display.

17. The electronic translator of claim 12, wherein said audio output device comprises a cochlear implant, hearing aid or other hearing enhancement device, whereby, a hearing impaired person can identify speech sounds generated by said cochlear implant, hearing aid or other hearing enhancement device as corresponding to words that are signed in said video stream.

18. The electronic translator of claim 12, wherein said processor further includes programming for establishing a telephone connection with a telephone, transmitting said second speech signal over a transmitter in said telephone, and receiving a third speech signal from a receiver in said telephone for translation by said speech-to-text translator and display on said video display.

19. The electronic translator of claim 1, wherein said processor and said display are incorporated in a laptop computer.

20. The electronic translator of claim 1, further comprising a keyboard interfaced to said processor for entering said text data stream, and wherein said processor is further programmed to display text corresponding to said text data stream on said display simultaneously with said video stream.

21. The electronic translator of claim 20, wherein said at least one audio output device comprises a cochlear implant, hearing aid or other hearing enhancement device and one or more audio speakers, and said translator further comprises a sound card interfaced to said processor, said sound card having a first output channel interfaced to said cochlear implant, hearing aid or other hearing enhancement device and a second output channel interfaced to said audio speaker, and, wherein, said processor is programmed to switch on said second channel only if said text data stream translated by said text-to-speech translator has been generated by said keyboard to avoid generation of feedback between said audio speaker and said audio receiver when said text data stream is generated by said speech-to-text translator.

22. The electronic translator of claim 1, further comprising:
a keyboard interfaced to said processor for entering a text data stream to be translated by said text-to-sign language translator;
an audio receiver for detecting a person's speech and generating a first speech signal in response thereto;
a speech-to-text translator for converting said first speech signal into a text data stream to be translated by said text-to-sign language translator;
a text-to-speech translator in said processor for translating said text data stream into a second speech signal;
at least one audio output device interfaced to said processor for receiving said second speech signal and generating a speech sound simultaneously with the display of said video stream on said video display; and
wherein each of said video clips begins and ends with said person signing said words in a selected position to facilitate seamless sequencing of said clips in said video stream.

23. The electronic translator of claim 22, further including at least one additional translator in said processor and associated database interfaced to said processor selected from the group comprising a text-to-image translator for translating said text into one or more images contained in an image database that are associated with words in said text data stream, and displaying said images simultaneously with said words on said video display; a text-to-phonetic spelling translator for translating words in said text data stream into text of phonetic spellings of said words contained in a phonetic spelling database, and displaying said phonetic spelling text on said video display; and, a text-to-audio sound translator for translating words in said text data stream into environmental sounds that are related to said words and are contained in an environmental sounds database, and playing said audio sounds on said audio output device.

24. The electronic translator of claim 22, wherein said audio output device comprises a cochlear implant, hearing aid or other hearing enhancement device, whereby, a hearing impaired person can identify speech sounds generated by said cochlear implant, hearing aid or other hearing enhancement device as corresponding to words that are signed in said video stream.

25. The electronic translator of claim 22, wherein said database further includes a plurality of finger spelling video movies for signing individual letters of the alphabet, and said text-to-sign language translator further includes programming for determining that a word in said text data stream does not have a corresponding signing video in said database, and accessing said finger spelling videos to display sign language spelling of said word.

26. The electronic translator of claim 22, wherein said text-to-sign language translator includes a speed control for adjusting a play speed of said video clips to enable synchronization of said video clips with said text data stream as they are simultaneously displayed on said video display.

27. The electronic translator of claim 22, wherein said processor further includes programming for simultaneously displaying text, corresponding to said text data stream, on said display in a first, scrolling marquee format and in a second, static format.

28. The electronic translator of claim 22, wherein said processor further includes programming for displaying a plurality of information windows on said video display, including at least a first window for displaying said video stream and a second window for displaying text corresponding to said text data stream.

29. The electronic translator of claim 22, wherein said at least one audio output device comprises a cochlear implant, hearing aid or other hearing enhancement device and one or more audio speakers, and said translator further comprises a sound card interfaced to said processor, said sound card having a first output channel interfaced to said cochlear implant, hearing aid or other hearing enhancement device and a second output channel interfaced to said audio speaker, and, wherein, said processor is programmed to switch on said second channel only if said text data stream translated by said text-to-speech translator has been generated by said keyboard to avoid generation of feedback between said audio speaker and said audio receiver when said text data stream is generated by said speech-to-text translator.

30. The electronic translator of claim 22, wherein said processor further includes programming for displaying text corresponding to said text data stream simultaneously with the generation of said speech sound and display of said video stream on said video display.

31. The electronic translator of claim 22, wherein said processor further includes programming for highlighting words in said text being displayed on said video display as said highlighted words are being signed by said text-to-sign language translator, and generated by said audio output device.

32. The electronic translator of claim 31, wherein said audio output device comprises a cochlear implant, hearing aid or other hearing enhancement device, whereby, a hearing impaired person can identify speech sounds generated by said cochlear implant, hearing aid or other hearing enhancement device as corresponding to words that are signed in said video stream and highlighted in said text on said video display.

33. The electronic translator of claim 22, wherein said processor further includes programming for establishing a telephone connection with a telephone, transmitting said second speech signal over a transmitter in said telephone, and receiving a third speech signal from a receiver in said telephone for translation by said speech-to-text translator and display on said video display.

34. The electronic translator of claim 22, wherein said processor and said display are incorporated in a laptop computer.

35. An electronic translator for translating speech into multiple forms in real time comprising:
   an audio receiver for detecting a person's speech and generating a first speech signal in response thereto;
   a keyboard for entering a first text data stream to be translated;
   a processor, said processor including:
      a speech-to-text translator for converting said first speech signal into a second text data stream; and
      a text-to-speech translator for selectively converting said first or said second text data streams into a second speech signal;
   a video display interfaced to said processor for displaying text that corresponds to said first and second text data streams; and
   an audio output device interfaced to said processor for receiving said second speech signal and generating a speech sound simultaneously with the display of said text.

36. The electronic translator of claim 35, further including at least one additional translator in said processor selected from the group comprising a text-to-image translator for translating said text data streams into one or more images that are associated with words in said text data streams, and displaying said images simultaneously with said words on said video display; a text-to-phonetic spelling translator for translating words in said text data streams into text of phonetic spellings of said words, and displaying said phonetic spelling text on said video display; and, a text-to-audio sound translator for translating words in said text data streams into environmental sounds that are related to said words, and playing said audio sounds on said audio output device.

37. The electronic translator of claim 35, wherein said audio output device comprises a cochlear implant, hearing aid or other hearing enhancement device, whereby, a hearing impaired person can identify speech sounds generated by said cochlear implant, hearing aid or other hearing enhancement device as corresponding to words in said text data streams.

38. The electronic translator of claim 35, further including a text-to-sign language translator in said processor for converting said text data streams into a video stream of a person using sign language to sign words in said data streams, and a database interfaced to said processor and containing a plurality of video clips of a person signing words, each of said video clips showing the signing at least one word; wherein, said text-to-sign language translator further includes programming responsive to said text data stream for detecting words therein, sequentially retrieving video clips in said database showing signing of said words, and playing said video clips sequentially on said video display as a continuous video stream.

39. The electronic translator of claim 38, wherein said database further includes a plurality of finger spelling video movies for signing individual letters of the alphabet, and said text-to-sign language translator further includes programming for determining whether a word in said text data stream has a corresponding signing video clip in said database, and if not, accessing said finger spelling videos to display sign language spelling of said word.

40. The electronic translator of claim 38, wherein said text-to-sign language translator includes a speed control for adjusting a play speed of said video clips to enable synchronization of said video clips with said text data stream as they are simultaneously displayed on said video display.

41. The electronic translator of claim 38, wherein each of said video clips begin and end with a person in a selected position to facilitate seamless sequencing of said clips in said video stream.

42. The electronic translator of claim 38, wherein said processor further includes programming for highlighting words in said text being displayed on said video display as said highlighted words are being signed by said text-to-sign language translator, and generated by said audio output device.

43. The electronic translator of claim 42, wherein said audio output device comprises a cochlear implant, hearing aid or other hearing enhancement device, whereby, a hearing impaired person can identify speech sounds generated by said cochlear implant, hearing aid or other hearing enhancement device as corresponding to words that are signed in said video stream and highlighted in said text on said video display.

44. The electronic translator of claim 35, wherein said processor further includes programming for simultaneously displaying text, corresponding to said text data streams, on said display in a first, scrolling marquee format and in a second, static format.

45. The electronic translator of claim 35, wherein said at least one audio output device comprises a cochlear implant, hearing aid or other hearing enhancement device and one or more audio speakers, and said translator further comprises a sound card interfaced to said processor, said sound card having a first output channel interfaced to said cochlear implant, hearing aid or other hearing enhancement device and a second output channel interfaced to said audio speaker, and, wherein, said processor is programmed to switch on said second channel only if said text data stream translated by said text-to-speech translator has been generated by said keyboard to avoid generation of feedback between said audio speaker and said audio receiver when said text data stream is generated by said speech-to-text translator.

46. The electronic translator of claim 35, wherein said processor further includes programming for establishing a telephone connection with a telephone, transmitting said second speech signal over a transmitter in said telephone, and receiving a third speech signal from a receiver in said telephone for translation by said speech-to-text translator and display on said video display.

47. The electronic translator of claim 35, wherein said processor and said display are incorporated in a laptop computer.

48. The electronic translator of claim 35, wherein said processor further includes programming for displaying a plurality of information windows on said video display, including at least a first window for displaying translated text and a second window for displaying control functions.

49. A method for translating a text data stream in real time comprising the steps of:

generating a text data stream;

translating said text data stream into a video stream of a person using sign language to sign words in said data stream by accessing a database containing a plurality of video clips of a person signing words, each of said video clips showing the signing for at least one particular word, said database also containing a plurality of finger spelling video clips showing a person signing individual letters of the alphabet; sequentially retrieving video clips in said database showing signing of said words in said text data stream for any of said words that are determined to have a corresponding signing video in said database, and/or finger spelling video clips corresponding to the spelling of any of said words in said text data stream that are determined not to have a corresponding video in said database; and, combining said sequentially retrieved video clips to form said video stream;

displaying text that corresponds to said text data stream on a video display; and displaying said video stream simultaneously with said text on said display.

50. The method of claim 49, further comprising the steps of translating said text data stream into a speech signal; and, driving an audio output device with said speech signal simultaneously with the display of said video stream and said text.

51. The method of claim 50, wherein the step of driving an audio output device with said speech signal further comprises driving a cochlear implant, hearing aid or other hearing enhancement device with said speech signal.

52. The method of claim 51, further including the step of highlighting words in text being displayed on said video display as said highlighted words are being generated by said cochlear implant, hearing aid or other hearing enhancement device so that a hearing impaired person using said cochlear implant, hearing aid or other hearing enhancement device can identify a sound generated by the cochlear implant, hearing aid or other hearing enhancement device as corresponding to said highlighted words.

53. The method of claim 49, further comprising the step of adjusting a playback speed of said video clips to synchronize of said video clips with said text as said video stream and said text are simultaneously displayed on said video display.

54. The method of claim 49, wherein each of said video clips is selected to begin and end with a person in a selected position to facilitate seamless sequencing of said clips in said video stream.

55. The method of claim 49, further including the step of highlighting words in said text being displayed on said video display as said highlighted words are being signed in said video stream.

56. The method of claim 49, further comprising one or more of the steps selected from the group comprising:

1) displaying a phonetic spelling representation of a word as it is signed in said video stream;

2) playing an audio sound that is related to a word as it is signed in said video stream; and 3) displaying one or more images that are associated with said text as said text is displayed.

57. The method of claim 49, wherein the step of generating a text data stream further comprises entering said text data stream with a keyboard.

58. The method of claim 49, wherein the step of generating a text data stream further comprises generating a speech signal in response to a person speaking, and translating said speech signal into said text data stream.

59. A method for translating speech into multiple formats in real time comprising the steps of:

generating a first speech signal in response to a person speaking;

translating said speech signal into a text data stream;

translating said text data stream into a second speech signal;

driving an audio output device with said second speech signal; and simultaneously displaying text that corresponds to said text data stream on a video display.

60. The method of claim 59, wherein the step of driving an audio output device with said second speech signal further comprises driving a cochlear implant, hearing aid or other hearing enhancement device with said second speech signal.

61. The method of claim 60, further including the step of highlighting words in text being displayed on said video display as said highlighted words are being generated by said cochlear implant, hearing aid or other hearing enhancement device so that a hearing impaired person wearing said cochlear implant can identify a sound generated by the cochlear implant, hearing aid or other hearing enhancement device as corresponding to said highlighted words.

62. The method of claim 59, further comprising the steps of:

translating said text data stream into a video stream of a person using sign language to sign words in said data stream by accessing a database containing a plurality of video clips of a person signing words, each of said video clips showing the signing for at least one par ticular word; and sequentially retrieving video clips in said database showing signing of said words in said text data stream to form said video stream; and displaying said video stream simultaneously with said text on said display.

63. The method of claim 62, wherein said database further includes a plurality of finger spelling video movies for signing individual letters of the alphabet, and said method further comprise the steps of determining whether a word in said text data stream has a corresponding signing video in said database, if not, sequentially retrieving finger spelling videos corresponding to the spelling of said word.

64. The method of claim 62, further comprising the step of adjusting a playback speed of said video clips to synchronize of said video clips with said text as said video stream and said text are simultaneously displayed on said video display.

65. The method of claim 62, wherein each of said video clips is selected to begin and end with a person in a selected position to facilitate seamless sequencing of said clips in said video stream.

66. The method of claim 62, further including the step of highlighting words in said text being displayed on said video display as said highlighted words are being signed in said video stream.

67. The method of claim 59, further comprising one or more of the steps selected from the group comprising:
1) displaying a phonetic spelling representation of a word as it is signed in said video stream;
2) playing an audio sound that is related to a word as it is signed in said video stream; and
3) displaying one or more images that are associated with said text as said text is displayed.

68. The method of claim 59, further comprising the steps of establishing a telephone connection with a telephone, transmitting said audio signal over a transmitter in said telephone, receiving a second speech input signal from a receiver in said telephone, translating said second speech signal into a second text data stream, and displaying said second text data stream on said video display.

* * * * *